United States Patent
Lung

(10) Patent No.: US 11,926,079 B2
(45) Date of Patent: Mar. 12, 2024

(54) FOAM FABRIC

(71) Applicant: Taikone Technologies Inc., Dongguan (CN)

(72) Inventor: Andrew Lung, Dongguan (CN)

(73) Assignee: Taikone Technologies Inc. (CN)

( * ) Notice: Subject to any disclaimer, the term of this patent is extended or adjusted under 35 U.S.C. 154(b) by 546 days.

(21) Appl. No.: 17/036,979

(22) Filed: Sep. 29, 2020

(65) Prior Publication Data

US 2021/0187800 A1 Jun. 24, 2021

Related U.S. Application Data

(60) Provisional application No. 62/951,421, filed on Dec. 20, 2019.

(51) Int. Cl.
| | |
|---|---|
| B29C 44/34 | (2006.01) |
| B29C 44/12 | (2006.01) |
| B29C 44/22 | (2006.01) |
| B29C 44/56 | (2006.01) |
| B29K 105/00 | (2006.01) |
| B29K 105/04 | (2006.01) |
| B29K 105/16 | (2006.01) |
| C08J 9/10 | (2006.01) |
| C08J 9/33 | (2006.01) |
| C08J 9/35 | (2006.01) |
| C08K 3/22 | (2006.01) |
| C08K 5/06 | (2006.01) |
| C08K 5/17 | (2006.01) |
| C08K 5/23 | (2006.01) |
| C08K 5/3492 | (2006.01) |
| C09J 11/04 | (2006.01) |
| C09J 163/00 | (2006.01) |
| C09J 193/04 | (2006.01) |

(52) U.S. Cl.
CPC .......... *B29C 44/22* (2013.01); *B29C 44/1285* (2013.01); *B29C 44/3426* (2013.01); *B29C 44/3442* (2013.01); *B29C 44/56* (2013.01); *C08J 9/33* (2013.01); *C08J 9/35* (2013.01); *C08K 3/22* (2013.01); *C08K 5/06* (2013.01); *C08K 5/17* (2013.01); *C08K 5/23* (2013.01); *C08K 5/3492* (2013.01); *C09J 11/04* (2013.01); *C09J 163/00* (2013.01); *C09J 193/04* (2013.01); *B29K 2105/0097* (2013.01); *B29K 2105/04* (2013.01); *B29K 2105/16* (2013.01); *B29K 2995/0063* (2013.01); *C08J 9/103* (2013.01); *C08J 2363/00* (2013.01); *C08J 2393/04* (2013.01); *C08K 2003/2241* (2013.01)

(58) Field of Classification Search
CPC . C08J 9/33; C08J 9/35; C08J 9/06–108; C09J 163/00–10
See application file for complete search history.

(56) References Cited

U.S. PATENT DOCUMENTS

| | | | | |
|---|---|---|---|---|
| 3,594,335 A | * | 7/1971 | Schultz et al. | B29C 67/207 521/137 |
| 3,746,610 A | * | 7/1973 | Hoegger | B29B 17/0042 428/314.2 |
| 4,661,539 A | * | 4/1987 | Goel | C08G 59/50 523/400 |
| 4,868,229 A | * | 9/1989 | Hart | C08G 59/18 523/400 |
| 4,919,866 A | * | 4/1990 | Kubbutat | C08K 7/28 264/45.3 |

FOREIGN PATENT DOCUMENTS

| | | | | |
|---|---|---|---|---|
| CN | 110640960 A | * | 1/2020 | B29C 44/02 |
| GB | 1377974 A | * | 12/1974 | B29C 70/66 |

OTHER PUBLICATIONS

Machine Translation of CN110640960A. Jan. 3, 2020. (Year: 2020).*

* cited by examiner

*Primary Examiner* — Stephen E Rieth
(74) *Attorney, Agent, or Firm* — Davidson, Davidson & Kappel, LLC

(57) ABSTRACT

The present invention is related to a foam fabric comprised of foam particles, a foaming agent, an antibacterial agent, a filler and a glue and methods of making it. The foaming agent is comprised eg of azodicarbonamide, triazinyl triazine, ethanolamine and aluminum potassium sulfate; the antibacterial agent is comprised eg of 2,4,4'-trichloro-2'-hydroxydiphenyl ether and ethylene oxide; the filler is chosen eg from titanium dioxide, iron oxide, mica powder and combinations thereof; and the glue is comprised of eg a rosin resin and an epoxy composite resin, wherein the epoxy composite resin is comprised of an epoxy resin, a terpene resin, aluminum oxide, polybutene and an emulsifier and a solvent.

17 Claims, No Drawings

FOAM FABRIC

FIELD OF THE INVENTION

The present invention is related to a foam fabric and method of making it. The foam fabric of the present invention can be manufactured using scraps of foam that are scraps, remnants fragments and leftovers of manufacturing processes for other products such as foam sponges, make-up applicator sponges, sofa cushions, notebook covers, Cellular phone case, computer bag, tablets bag, pillows, cup holder, baseball caps, floor mats, crutches cushion pad, outer and inner lining for shoes, packaging for cosmetic accessories, yoga mats, exercise mats.

BACKGROUND OF THE INVENTION

The use of products manufactured from foam materials has increased greatly in recent years. Foam is advantageous due to its high softness, large elasticity and good water absorption and it is widely used in cosmetic sponges, washing appliances, upholstery in e.g. sofa and chair cushions, pillows, mattresses, car cushions, children's car seats, cleaning sponges, insulation, sound proofing, toys such as balls, sporting protective gear including boxing gloves, shin guards and exercise mats and other products.

The two most used foam types in reusable packaging are polyurethane and polyethylene foams. Polyurethane (PU and also called polyester)—is a spongy foam like the consistency of foam used in pillows or mattress covers. It is an open cell material which means it will absorb liquids. Polyurethane is also used for cosmetic sponges.

Closed cell foams can be used for e.g. outdoor cushions, boat cushions, exercise equipment, gaskets and insulation.

Chipped polyurethane foam/laminated foam chips can be used for e.g. carpet padding, gym mats, yoga mats.

During the processing of the foam material products, it is necessary to cut the foam material, with the remaining foam tossed away as waste. For businesses that manufacture foam products, waste recycling impacts the cost of production.

OBJECTS AND SUMMARY OF THE INVENTION

The present invention seeks an environmentally friendly use for the scraps and fragments left over from the processing of foam material products.

It is a further object of the present invention to create a useful product out of foam scraps to reduce the cost of manufacturing foam products.

It is an object of the present invention to develop a method of making a foam fabric having a density of about 300 to about 450 g/m2 which is soft, comfortable, has high elasticity and a concave/convex surface texture.

It is a further object of the present invention to develop a simple process to use scraps and fragments left over from the processing of foam material products, thereby improving the resource utilization rate and reducing the production cost of foam material products. It is also an object to develop a process that is easy to control and has high production efficiency.

It is an object of the present invention to develop a foam fabric which is soft and comfortable and has a high elasticity. It is a further object to develop a foam fabric which has a textured surface feeling, with concave and convex elements.

In accordance with the above objects and others, the present invention is directed in part to a process for making a foam fabric comprising: A) cutting foam into different particle sizes and shapes; B) adding a foaming surfactant agent, an antibacterial agent, a filler and optionally a color agent to the foam and then mixing all of the ingredients; C) adding a glue into the mixture from step B by spraying the glue and then stirring or alternatively by mixing in the glue and then stirring; D) pouring the mixture of step C into a machine for molding foam and then pressing, molding and steaming the mixture; E) removing the molded/pressed/steamed foam from step D from the machine and cutting the block of foam into sections of foam fabric.

In certain embodiments of the present invention, the foam of step A is cut into smaller and larger sized pieces or into small, medium and large size pieces. In preferred embodiments, a portion of the foam is cut into e.g. three sizes and shapes of particles, which improves the mixing and dispersing of the foam particles. Mixing larger particles which have been cut into different sizes and shapes with the small particles can give the finished fabric a concave and/or convex texture on the surface.

In certain preferred embodiments, the small sized pieces are from about 0.1 mm to about 3 mm and the large size pieces are from about 4 mm to about 10 mm in size. In certain other preferred embodiments the foam is cut into three sizes and shapes of particles and the medium sized pieces are from about 4 to about 8 mm, the small sized pieces are approximately 0.1 mm-3 mm and the large sized particles are approximately 10 mm in size. In certain other preferred embodiments the foam is cut into three sizes and shapes of particles and the medium sized pieces are from about 4 to about 8 mm, the small sized pieces are approximately 0.1 mm-3 mm and the large sized particles are approximately 8-10 mm in size. In other preferred embodiments, the small sized particles of foam in step A are about 60% of the total foam, the medium sized particles of foam in step A are about 20 to about 30% of the total foam and the large sized particles of foam in step A are about 10 to about 15% of the total foam. In other preferred embodiments, the small sized particles of foam in step A are about 60% of the total foam, the medium sized particles of foam in step A are about 30% of the total foam and the large sized particles of foam in step A are about 15% of the total foam. In certain other preferred embodiments, the percentage of foam particles in the foam fabric are about 38% to about 43% of small sized particles, about 12% to about 22% of medium sized particles and about 6% to about 11% of large sized particles. In certain other preferred embodiments, the percentage of foam particles in the foam fabric are about 37 to about 45% of small sized particles, about 12% to about 22% of medium sized particles and about 6% to about 12% of large sized particles. The percentage of larger and smaller and/or medium sized particles is chosen based on the desired design and texture for the final foam fabric. In certain embodiments, there are more than three sizes and shapes of particles. In certain embodiments, the particles are of random sizes and shapes extending from 0.1 mm to 10 mm in size or even larger, with larger foam particle sizes providing a final foam fabric that is softer and less abrasive.

In certain embodiments, foam used in step A is obtained from remnants or scraps left over from the manufacture of a foam product. In other embodiments, the foam is new foam manufactured to make the foam fabric. In certain other embodiments, the foam is a combination of waste foam from the manufacture of other foam products and new foam manufactured to make the foam fabric.

In certain embodiments, the foam from step A is evenly dispersed with a second portion of foam which is in very small granular pieces obtained as a waste product from the manufacture of a foam product or by grinding foam into very small pieces or a combination thereof. The second portion of foam is comprised of small granular pieces are from about 0.1 mm to about 3 mm. In certain embodiments the foam waste products are remnants or scraps obtained in granular size. In certain other embodiments, the foam is ground or cut into the small granular pieces.

In step D, the mixture is pressed/molded while the glue dries or activates. In certain embodiments, the pressure applied to the foam while in the mold is about 180 to about 220 tons of pressure. In certain preferred embodiments, steam is pumped into the mold, preferably through holes for this purpose in the molding machine, to activate the glue. In certain other embodiments, the mold is heated to activate the glue without steam. In further alternative embodiments, the mixture is just subjected to pressure in the mold without the addition of heat or steam.

In certain embodiments, after the block of foam is removed from the mold in step E, the block of foam is cut using a slicing machine which to skive the block of sponge into layers of foam fabric. In preferred embodiments, the foam fabric has a thickness of about 1 mm to about 3 mm.

In certain embodiments, the foaming surfactant agent is a foaming surfactant agent having a polyurethane base or polyethylene. In preferred embodiments, the foaming surfactant agent is selected from azodicarbonamide, triazinyl triazine, ethanolamine and aluminum potassium sulfate and mixtures thereof. In certain embodiments, the amount of foaming surfactant added in step C is from about 10% to about 12%, and preferably about 11%. The addition of the foaming surfactant agent increases the foaming efficiency of the mixture, reduces the foaming time and ensures that the foaming is uniform, so that the mixture can be foamed completely while inside the mold. The foaming time is the time for the mixture inside the mold to foam. In certain embodiments, the steam is added from the top and bottom of the molding machine. In certain preferred embodiments, additional holes are placed throughout the machine to allow additional steam to contact the mixture within the mold, thereby increasing the amount of steam inserted into the mold, thereby decreasing the steaming process and the foaming time. In certain embodiments, the mixture in the mold is subjected to pressure and steam for about 2 hours to obtain foam. In certain preferred embodiments, the mixture is subjected to increased steam and/or pressure to shorten the steaming process and the foaming time to about 1 hour.

In certain embodiments, the temperature of the steam foaming treatment in step D is 260° C., the time is 20 minutes, and the molding pressure is 220 tons. In certain other embodiments, the temperature is about 200 to about 260° C. and the pressure in the mold is from about 180 to about 220 tons, with the time being about 20-30 minutes.

In certain embodiments, the glue is a mixture of rosin resin and epoxy composite resin with a weight ratio of 2:3; the rosin resin is KL1000W liquid rosin resin.

In certain embodiments, the antibacterial agents is iodopropynyl butylcarbamate. In certain embodiments, additional antibacterial agent is included in the glue. In preferred embodiments, the antibacterial agent is a mixture of 2,4,4-trichloro-2'-hydroxydiphenyl ether and ethylene oxide The amount of antibacterial agent added in step C is from about 3% to about 6%, and preferably about 4%. The antibacterial agent improves the antibacterial properties of the foam fabric and prevents bacteria from growing on the finished products.

In certain embodiments, foam particles can be used as the filler. In certain embodiments, other types of foams, such as polyethylene foam, ethylene vinyl acetate, polyurethane foam and mixtures thereof can be used as a filler. In preferred embodiments of the present invention, the filler is at least one of titanium dioxide, iron oxide and mica powder or combinations of these ingredients. More preferably, the filler is a mixture of titanium dioxide, iron oxide and mica powder with a weight ratio of 2-4:1:3-4. The amount of filler added in step C is from about 12% to about 20%, and preferably about 15%. The filler improves the dispersion of the mixture system and improves the texture of the foam fabric, making it more delicate and even.

In certain embodiments, one or more color agents are used to give decorative color to the foam fabric. When waste foam is used, the foam may be obtained in various colors. It is alternatively possible to add color to the foam. In preferred embodiments, a color agent is added to the foam at the same time as the foaming surfactant agent, the antibacterial agent, and the filler. It other embodiments the color agent is added after the foaming surfactant agent, antibacterial agent and the filler are mixed with the foam particles. Any color agent known to those of skill in the art can be used. In certain preferred embodiments, the color agent is at least one of lemon yellow, sunset yellow, indigo, bright blue, lac red and blueberry red.

In embodiments of the present invention, in step B, the mixing weight ratio of the foam, the foaming surfactant agent, the antibacterial agent, the color agent and the filler in step B is 70-80:10-12:3-6:5-8:12-20. In certain preferred embodiments of the present invention, the foaming surfactant agent is about 70 to about 80% of the ingredients added to the mixture in step B, the antibacterial agent is about 10 to about 12% of the ingredients added to the mixture in step B, the color agent is about 5 to about 8% of the ingredients added to the mixture in step B and the filler is about 15 to about 20% of the ingredients added to the mixture in step B. In other preferred embodiments of the present invention, the foaming surfactant agent is about 70 to about 80% of the ingredients added to the mixture in step B, the antibacterial agent is about 3 to about 6% of the ingredients added to the mixture in step B, the color agent is about 5 to about 8% of the ingredients added to the mixture in step B and the filler is about 12 to about 20% of the ingredients added to the mixture in step B.

In certain embodiments of the present invention, the filler performs a function such as anti-odor. The filler can be made of e.g. be made of bamboo sponge or bamboo powder which removes odor.

In certain embodiments of the present invention, the glue is a mixture of rosin resin and epoxy composite resin glue. In certain preferred embodiments, the rosin resin is KL1000W liquid rosin resin. In certain preferred embodiments the epoxy composite resin comprises epoxy resin, terpene resin, aluminum oxide, polybutene, emulsifier OP-10, and a solvent. In certain preferred embodiments, the epoxy resin is CYD-118 bisphenol, a liquid epoxy resin, the terpene resin is GT-30A liquid terpene resin. In certain preferred embodiments, the solvent is a mixture of cyclohexane, diethyl ether and acetone.

In further embodiments, the glue has a weight ratio of rosin resin and epoxy composite resin glue of about 1 to about 2:3-6. In certain embodiments, the mixing weight ratio of glue added in step D to the mixture of foaming surfactant agent, antibacterial agent and filler is from about 8 to about 12:1. In certain preferred embodiments, the final foam fabric is comprised of from about 8 to about 13% glue, about 70 to about 80% foam, about 5 to about 8% color agent, about 3 to about 6% antibacterial agent, about 10 to about 12% foaming surfactant agent and about 10 to about 20% of a filler. In other embodiments the foam fabric is comprised of from about 63 to about 72% foam, about 9 to about 10% foaming surfactant agent, about 2% to about 5% antibacterial agent, about 4 to about 7% color and about 10 to about 18% filler. In other preferred embodiments, the final foam fabric is comprised of from about 8 to about 12% glue, about 62 to about 70% foam, about 4 to about 7% color agent, about 2 to about 5% antibacterial agent, about 8 to about 11% foaming surfactant agent and about 10 to about 18% of a filler.

The glue of the present invention is any glue capable of binding the raw materials such as foam, filler, color agent, foaming agent and antibacterial agent into a group, forming a new foam structure, and then after the subsequent steam foaming and molding treatment, forming a new foam. In certain embodiments, the glue is an epoxy composite resin glue with good compatibility with the materials, and which can reduce the viscosity of the material system. In preferred embodiments, the epoxy composite resin glue is also capable of improving the adhesion and adhesion, has strong resistance to temperature change and chemical stability and can still maintain excellent stability in various seasons and workshop operation conditions, and does not easily age, become brittle or fall off. In more preferred embodiments, the glue is a rosin resin which can be used in combination, allowing for significant increase in the binding properties of the glue to the foam and other ingredients, improvement of the viscosity and cohesion of the glue, and improvement in the dispersion and adhesion of the glue to the materials. For example, K11000w liquid rosin resin has high compatibility, high heat resistance, low temperature resistance and can improve the weather resistance of the glue.

Use of the preferred amounts of each ingredient leads to improved dispersibility of the foam and improved foaming efficiency and effect of the mixture and results in a foam fabric having good antibacterial performance and a fine texture that is both soft and comfortable and also has good tear resistance.

In certain embodiments of the present invention, the foam is a mixture of small sized particles of foam, medium sized particles of foam and large sized particles of foam, with a weight ratio of 5-8:3-6:2. The choice of foam particle size depends on the appearance and texture of foam fabric that is desired and can vary widely. In certain embodiments, the starting foam is comprised of about 10 to about 15% of large particles, about 20 to about 30% of medium particles and about 60% of small particles. In certain embodiments, the smallest sized particles comprise from about 30 to about 70% of the total amount of foam. The average particle size of the small sized particles of foam is from about 1 mm to about 3 mm, the average particle size of the medium sized particles of foam is from about 4 mm to about 6 mm, and the average particle size of the large sized particles of foam is from about 10 mm to about 12 mm.

In certain embodiments of the present invention, the foaming surfactant agent comprises 3-6 parts of Azodicarbonamide, 1-2 parts of triazinyl triazine, 2-3 parts of ethanolamine and 1-2 parts of aluminum potassium sulfate. The use of Azodicarbonamide produces bubbles in the foaming process that are uniform and dense, and increases the bounce, strength and flexibility of the foam.

In certain preferred embodiments the foaming surfactant comprises about 3 to about 6 percent of the combination of foaming surfactant/antibacterial/filler added to the foam.

In certain preferred embodiments of the present invention, the antibacterial agent is a mixture of 2,4,4-trichloro-2'-hydroxydiphenyl ether and ethylene oxide in a weight ratio of 2-4:1. The inclusion of the antibacterial agent improves the antibacterial properties of the foam fabric product generally by preventing bacteria from adhering to the product.

In certain embodiments of the present invention, the mixture of Step E is steamed after the mixture is molded and pressed in the molding machine at a temperature of from about 200° C. to about 260° C. In certain embodiments the steam is applied to the mixture for approximately 20 to about 30 minutes.

In preferred embodiments, the foaming temperature and time are controlled/adjusted to ensure the mixture is fully foamed, including the internal center of the mixture. If the foaming temperature is too high and the foaming time is too long, the energy consumption and cost of production will be increased. If the foaming temperature is too low and/or the time is too short, the foaming in the internal center of the mixture will be incomplete, leading to failure of the foaming or the need to extend the foaming time, which in turn increases both the energy consumption and cost.

In preferred embodiments the molding pressure is controlled/adjusted to ensure that the fabric foam has a better density and higher softness. If the molding pressure is excessive, it is difficult for steam to penetrate the mixture, making it difficult for the mixture to foam completely. Increased temperature and time for the steam foaming will then be needed with a resultant increase in energy consumption and cost. Excessive molding pressure also leads to high density of the foam fabric, reducing foam softness. Alternatively, if the molding pressure is too low, the resulting foam fabric is difficult to form. The fabric is not dense enough and the large pieces of foam are not fluffy enough, such that the surface of the foam will not have the desired concave/convex texture.

The present invention also is directed in part to a process for making a foam fabric comprising: A) cutting foam into different particle sizes and shapes; B) adding a foaming surfactant agent, an antibacterial agent, a filler and optionally a color agent to the dispersed foam and then mixing all of the ingredients; C) adding a glue to the foam by spraying or mixing in the glue and then stirring; D) pouring the mixture of step C into a machine for molding foam and then pressing, molding and steaming the mixture; E) removing the molded/pressed/steamed foam from step D from the machine and cutting the block of foam into sections of foam fabric. In certain embodiments, a foaming agent and/or surfactant agent and/or antibacterial agent and or a color agent can be mixed in with the foam before the glue is added or at the same time the glue is added.

DETAILED DESCRIPTION OF THE INVENTION

In preferred embodiments of the present invention, the epoxy composite resin adhesive comprises the following ingredients and percentages:

| Epoxy resin | 25-28% |
| Terpene resin | 18-20% |
| Aluminum oxide | 1.5-3.5% |

-continued

| | |
|---|---|
| Polybutene | 10-12% |
| Emulsifier OP-10 | 3-8% |
| Solvent | 30-35% |

In a preferred embodiment of the present invention, the epoxy resin is CYD-118 bisphenol a liquid epoxy resin; the terpene resin is GT-30A liquid terpene resin; and the solvent is a mixture of cyclohexane, diethyl ether and acetone with a weight ratio of 1:3:2-2.5.

The preferred epoxy composite resin adhesive results in a foam fabric having better softness, high temperature resistance and improved processing formability. The preferred epoxy composite resin adhesive also does not easily harden, and therefore will not affect the soft texture of the foam fabric which can be caused by the hardening of a traditional glue after high temperature foaming. When terpene resin and epoxy resin are compounded, the resulting composite resin adhesive has good compatibility with the foam, the viscosity of the foaming material system is reduced, the adhesion and adhesion is improved, and the resulting foam fabric has a strong resistance to temperature change and chemical stability, and does not age easily or become brittle. The alumina strengthens the composite resin adhesive and improves the dispersion of the composite resin adhesive and other materials in the foaming material. The polybutene has better viscosity, which improves the viscosity of composite resin adhesive, resulting in improved dispersion uniformity of the composite resin adhesive to other materials. The emulsifier OP-10 improves the emulsification degree of the resin components, and gives the composite resin adhesive better tear strength, tensile strength, oxidation resistance, aging resistance, etc. A preferred solvent improves the spray ductility of the composite resin adhesive, makes the glue easy to spray evenly in the mixture, and is easy to volatilize and remove in the process of steam foaming, thus increasing the viscosity of the glue. It also can glue the mixture into a group, forming the new foam structure.

In preferred embodiments of the present invention, the epoxy composite resin adhesive is prepared by the following steps: step 1) adding an epoxy resin, a terpene resin and aluminum oxide into two-thirds of the total amount of solvent, heating to about 35-45° C., and then stirring for 25-28 minutes to prepare material A; step 2) adding the emulsifier OP-10 into the remaining solvent, and increasing the temperature to 45-48° C., after which the emulsifier OP-10/solvent mix is mixed evenly to prepare material B; step 3): adding material B into material A and then heating to a temperature of from about 52 to about 56° C., while stirring for about 30-40 minutes, then adding polybutene, continue stirring for about 18-20 minutes at about 52 to about 56° C., then increasing the heat to about 60° C. and continuing to heat at that temperature for about 30-35 minutes to prepare epoxy composite resin adhesive for use in the glue.

In certain embodiments, the epoxy resin and terpene resin are dispersed by most of the solvents, and alumina is added to further improve the dispersion of the resin system, and also to improve the high temperature resistance, aging resistance and strength of the resin system. The combination of the emulsifier OP-10 with the remaining solvent improves the dispersion compatibility of the subsequent emulsifier solution and the resin system of material A. Controlling the temperature and mixing time of material B and material A after mixing, makes the resin system fully emulsified and improves the viscosity and cohesion of the glue. The addition of polybutene adjusts the viscosity of the composite resin glue and keeping the temperature at 60° C., further improves the cohesion of the glue and makes the glue have desired fluidity and ductility and also easy to spray out to adhere to the mixture of Step D.

The foam used as an ingredient of the present invention is formed using foam prepared from known manufacturing techniques. In certain embodiments, the foam is made from waste scraps and fragments of foam left over from the manufacturing of other products such as cosmetic sponges, couch cushions, pillows, etc.

The mold into which the mixture is poured in the molding step can be of varying sizes and shapes. In certain embodiments the mold has a length of 2 meters, a width of 1 meter and a thickness of 9 cm. A determination is made of the thickness of the fabric needed and then the molded foam is cut into fabric sections of the desired length and thickness. The foam fabric can used as is or can be stitched or glued together to form products such as cosmetic carriers, bags of a variety of sizes and shapes, brush holders, note book covers, garbage boxes and yoga mats. A fabric or paper lining can be glued, or stitched to the foam fabric to increase strength of the product or to create a lining on the interior of a product. Alternatively, it is possible to laminate a fabric lining to the foam fabric to increase the strength of the foam fabric.

DETAILED DESCRIPTION OF THE PREFERRED EMBODIMENTS

The following examples are not meant to be limiting and represent certain embodiments of the present invention.

Example 1

The manufacture of the foam fabric includes the following steps:

Step A: Cutting the foam into 70% small particles (approximately 1 mm), 20% medium particles (approximately 4 mm) and 10% large particles (approximately 12 mm) sized particles Step B: Dispersing the different sized foam particles evenly, and then adding to them a foaming surfactant agent, an antibacterial agent, a filler, and a color agent after which the combination of Step C: Spraying glue into the mixture from step B and stirring evenly, with the glue comprising 10-15% of the final fabric; Need exact number and really amount of each ingredient that comprises the glue Step D: Adding the mixture of step C to molding equipment and then molded at a pressure of 180 tons by pressing it in the molding equipment;

Step E: The molded foam is subjected to a steam foaming treatment in the molding equipment at a temperature of 200° C., for 30 minutes, at a pressure of the molding of 180 tons;

Step F: Removing the molded foam mixture from the molding equipment and cutting the molded foam into sections of foam fabric.

| Example 1 | |
|---|---|
| Foam Particles | 62% |
| Foam Surfactant | 10% |
| Antibacterial Agent | 3% |

Example 1 (continued)

| | |
|---|---|
| Color | 5% |
| Filler | 12% |
| Glue | 8% |
| Total | 100% |

In Step B, the mixing weight ratio of particle waste, foam surfactant agent, antibacterial agent, colorant and filler is 70-80:10-12:3-6:5-8:18-20. The foam surfactant agent includes 3 parts of Azodicarbonamide, 1 part of triazinyl triazine, 2 parts of ethanolamine and 1 part of aluminum potassium sulfate. The antibacterial agent is a mixture of 2,4,4-trichloro-2'-hydroxydiphenyl ether and ethylene oxide with a weight ratio of about 2:1; the color agent is lemon yellow; and the filler is titanium dioxide. The foaming surfactant agent comprises about 9 to about 11% in the final foam fabric.

In step C, the mixing weight ratio of the mixture and the glue is from about 8 to about 12 with the percentage of glue in the final foam fabric being about 8% to about 11%.

The foam is a mixture of small particles, medium particles and large particles with a weight ratio of 5-8:3-6:2, with the total amount of foam (including the filler) comprising from 70 to 80% of the foam fabric and with the foam in step A without inclusion of the filler comprising 63-72% of the foam fabric.

The glue is a mixture of rosin resin and epoxy composite resin with a weight ratio of 1-2:3-6; the rosin resin is KL1000W liquid rosin resin. In step B, the glue is about 8 to about 12% and the glue comprises about 8 to about 11% of the foam fabric.

The epoxy composite resin adhesive comprises the following weight parts of raw materials:

| | |
|---|---|
| Epoxy resin | 25 parts |
| Terpene resin | 18 parts |
| Aluminum oxide | 1.5 parts |
| Polybutene | 10 parts |
| Emulsifier OP-10 | 3 parts |
| Solvent | 30 parts |

The epoxy resin is CYD-118 bisphenol a liquid epoxy resin; the terpene resin is GT-30A liquid terpene resin; the solvent is a mixture of cyclohexane, diethyl ether and acetone with a weight ratio of 1:3:2.

The epoxy composite resin adhesive is prepared by the following steps:

Step (1): According to the weight, Adding epoxy resin, terpene resin and Aluminum oxide into two-thirds of the total amount of solvent, heating to 35° C., stirring for 28 minutes to prepare material A;

Step (2): According to the weight, Adding the emulsifier OP-10 into the remaining solvent, rising the temperature to 45° C., and then mixing then evenly to preparing material B;

Step (3): Adding prepared material B into prepared material A, Heating up to 52° C., stirring for 40 minutes, then adding polybutene, continue into stir for 20 minutes at 52° C., then heating up to 60° C. and keeping for 30 minutes to prepare epoxy composite resin adhesive for standby.

TABLE B

| Chemical components name | percentage | Example total grams = 100 |
|---|---|---|
| Foam particles: | | |
| large | 62% | |
| medium | | |
| small | | |
| Foaming agent: | | |
| Azodicarbonamide | 10% | |
| Tiazinyl triazine | | |
| Ethanolamine | | |
| Aluminum potassium sulfate | | |
| Antibacterial agent: | | |
| 2,4,4-trichloro-2'-hydroxydiphenyl ether | 3% | |
| Ethylene oxide | | |
| Color agent—lemon yellow | 5% | |
| Filler—titanium dioxide | 12% | |
| Glue: | | |
| 1. Rosin resin—KL1000W liquid rosin resin | 8% | |
| 2. Epoxy composite resin: | | |
| Epoxy resin—CYD-118 bisphenol | | |
| Terpene resin—GT-30A liquid terpene resin | | |
| Aluminum oxide | | |
| Polybutene | | |
| Emulsifier OP-10 | | |
| Solvent: | | |
| Cyclohexane | | |
| Diethyl ether | | |
| acetone | | |

The resultant foam fabric has a density of the foam of 200/m2.

Example 2

The manufacture of the foam fabric includes the following steps:

Step A: Cutting the foam into 37% to 60% small particles, and preferably 37 to 45% small particles (approximately 0.1-3 mm), 12-30% medium particles, and preferably 12% to 23% medium particles (approximately 4-8 mm) and 6-15% large particles, and preferably 6% to 12% large particles (approximately 10 mm) sized particles.

Step B: Dispersing the different sized foam particles evenly, and then adding to them a foaming surfactant agent, an antibacterial agent, a filler, and a color agent after which the combination of ingredients is stirred to obtain a mixture;

Step C: Spraying a glue into the mixture from step B and stirring evenly with the glue comprising 8-12% of the final fabric;

Step D: Adding the mixture of step C to molding equipment and then molded at a pressure of 180 tons by pressing it in the molding equipment;

Step E: The molded foam is subjected to a steam foaming treatment in the molding equipment at a temperature of 200° C., for 30 minutes, at a pressure of the molding of 180 tons.

Step F: Removing the molded foam mixture from the molding equipment and cutting the molded foam into sections of foam fabric.

Example 2

| | |
|---|---|
| Foam Particles | 67% |
| Foam Surfactant | 8% |
| Atibacterial Agent | 0% |
| Color | 6% |
| Filler | 10% |
| Glue | 9% |
| Total | 100% |

In step B, the mixing weight ratio of particle waste, foaming agent, antibacterial agent, color agent and filler is 72:10.5:4:7:18.5; in step C, the mixing weight ratio of mixture and glue is 9:1.

The particle waste is a mixture of small particle waste, medium particle waste and large particle waste with a weight ratio of 6:5:2. The average particle size of the small particle waste is 1.5 mm, the average particle size of the medium particle waste is 4.5 mm, and the average particle size of the large particle waste is 11.5 mm.

In step B, the foaming surfactant agent comprises 4 parts of Azodicarbonamide, 1.2 parts of triazinyl triazine, 2.2 parts of ethanolamine and 1.2 parts of aluminum potassium sulfate; the antibacterial agent is a mixture of 2,4,4-trichloro-2'-hydroxydiphenyl ether and ethylene oxide in a weight ratio of 2.5:1; the color agent is indigo; the filler is mica powder.

In step C, the glue is a mixture of rosin resin and epoxy composite resin glue with a weight ratio of 1.2:5; the rosin resin is KL1000W liquid rosin resin.

In the step C, the temperature of the steam foaming treatment is 220° C., the time is 28 minutes, and the pressure of the molding is 190 tons.

The epoxy composite resin adhesive comprises the following weight parts of raw materials:

| | |
|---|---|
| Epoxy resin | 26 parts |
| Terpene resin | 18.5 parts |
| Aluminum oxide | 2.0 parts |
| Polybutene | 10.5 parts |
| Emulsifier OP-10 | 4 parts |
| Solvent | 31 parts |

The epoxy resin is CYD-118 bisphenol a liquid epoxy resin; the terpene resin is GT-30A liquid terpene resin; the solvent is a mixture of cyclohexane, diethyl ether and acetone with a weight ratio of 1:3:2.1.

The epoxy composite resin adhesive is prepared by the following steps:

Step 1): According to the weight, adding epoxy resin, terpene resin and Aluminum oxide into two-thirds of the total amount of solvent, heating to 38° C., stirring for 27 minutes to prepare material A;

Step 2): According to the weight, Adding the emulsifier OP-10 into the remaining solvent, rising the temperature to 46° C., then mixing them evenly to prepare material B;

Step 3): Adding prepared material B into prepared material A, Heating up to 53° C., stirring for 38 minutes, then adding polybutene, continue into stir for 19.5 minutes at 53° C., then heating up to 60° C. and keeping for 31 minutes to prepare epoxy composite resin adhesive for standby.

The resultant foam fabric has a density of the foam of 340/m2.

TABLE C

| Chemical components name | percentage | Example total grams = |
|---|---|---|
| Foam particles: | | |
| large | 67% | |
| medium | | |
| small | | |
| Foaming agent: | | |
| Azodicarbonamide | 8% | |
| Tiazinyl triazine | | |
| Ethanolamine | | |
| Aluminum potassium sulfate | | |
| Antibacterial agent: | | |
| 2,4,4-trichloro-2'-hydroxydiphenyl ether | 0% | |
| Ethylene oxide | | |
| Color agent—indigo | 6% | |
| Filler—mica powder | 10% | |
| Glue: | | |
| 1. Rosin resin—KL1000W liquid rosin resin | 9% | |
| 2. Epoxy composite resin: | | |
| Epoxy resin—CYD-118 bisphenol | | |
| Terpene resin—GT-30A liquid terpene resin | | |
| Aluminum oxide | | |
| Polybutene | | |
| Emulsifier OP-10 | | |
| Solvent: | | |
| Cyclohexane | | |
| Diethyl ether | | |
| acetone | | |

Example 3

The manufacture of the foam fabric includes the following steps:

Step A: Cutting the foam into 38-43% small particles (approximately 0.1 mm-3 mm), 12-21% medium particles (approximately 4-8 mm) and 6-10% large particles (approximately 10-12 mm) sized particles;

Step B: Dispersing the different sized foam particles evenly, and then adding to them a foaming surfactant agent, an antibacterial agent, a filler, and a color agent after which the combination of ingredients is stirred to obtain a mixture;

Step C: Spraying a glue into the mixture from step B and stirring evenly;

Step D: Adding the mixture of step C to molding equipment and then molded at a pressure of 180 tons by pressing it in the molding equipment;

Step E: The molded foam is subjected to a steam foaming treatment in the molding equipment at a temperature of 200° C., for 30 minutes, at a pressure of the molding of 180 tons.

Step F: Removing the molded foam mixture from the molding equipment and cutting the molded foam into sections of foam fabric.
ingredients is stirred to obtain a mixture;

Example 3

| Example 3 | |
|---|---|
| Foam Particles | 70% |
| Foam Surfactant | 0% |
| Atibacterial Agent | 0% |
| Color | 8% |
| Filler | 11% |
| Glue | 11% |
| Total | 100% |

In step B, the mixing weight ratio of particle waste, foaming agent, antibacterial agent, color agent and filler is 75:11:3-6:6.5:19; in step C, the mixing weight ratio of mixture and glue is 10:1.

The particle waste is a mixture of small particle waste, medium particle waste and large particle waste with a weight ratio of 6.5:4.5:2. The average particle size of the small particle waste is 2 mm, the average particle size of the medium particle waste is 5 mm, and the average particle size of the large particle waste is 11 mm.

In step B, each surfactant foaming agent comprises 4.5 parts of Azodicarbonamide, 1.5 parts of triazinyl triazine, 2.5 parts of ethanolamine and 1.5 parts of aluminum potassium sulfate; the antibacterial agent is a mixture of 2,4,4-trichloro-2'-hydroxydiphenyl ether and ethylene oxide in a weight ratio of 3:1; the color agent is bright blue; the filler is titanium dioxide, iron oxide and mica powder in a weight ratio of 2:1:4 mixture of ingredients.

In step C, the glue is a mixture of rosin resin and epoxy composite resin with a weight ratio of 1.5:4.5; the rosin resin is KL1000W liquid rosin resin.

In the step C, the temperature of the steam foaming treatment is 230° C., the time is 25 minutes, and the pressure of the molding is 200 tons.

The epoxy composite resin adhesive comprises the following weight parts of raw materials:

| Epoxy resin | 26.5 parts |
|---|---|
| Terpene resin | 19 parts |
| Aluminum oxide | 2.5 parts |
| Polybutene | 11 parts |
| Emulsifier OP-10 | 5 parts |
| Solvent | 33 parts |

The epoxy resin is CYD-118 bisphenol a liquid epoxy resin; the terpene resin is GT-30A liquid terpene resin; the solvent is a mixture of cyclohexane, diethyl ether and acetone with a weight ratio of 1:3:2.3

The epoxy composite resin adhesive is prepared by the following steps:

Step 1): According to the weight, adding epoxy resin, terpene resin and Aluminum oxide into two-thirds of the total amount of solvent, heating to 40° C., stirring for 26.5 minutes to prepare material A;

Step 2): According to the weight, adding the emulsifier OP-10 into the remaining solvent, rising the temperature to 46.5° C., and then mixing them evenly to prepare material B;

Step 3): Adding prepared material B into prepared material A, Heating up to 54° C., stirring for 35 minutes, then adding polybutene, continue into stir for 19 minutes at 54° C., then heating up to 60° C. and keeping for 32 minutes to prepare epoxy composite resin adhesive for standby.

The resultant foam fabric has a density of the foam of 380/m2.

TABLE D

| Chemical components name | Percentage | Example total grams = |
|---|---|---|
| Foam particles: | | |
| large | 70% | |
| medium | | |
| small | | |
| Foaming agent: | | |
| Azodicarbonamide | 0% | |
| Tiazinyl triazine | | |
| Ethanolamine | | |
| Aluminum potassium sulfate | | |
| Antibacterial agent: | | |
| 2,4,4-trichloro-2'-hydroxydiphenyl ether | 0% | |
| Ethylene oxide | | |
| Color agent—bright blue | 8% | |
| Filler | | |
| Titanium dioxide | 11% | |
| Iron oxide | | |
| Mica powder | | |
| Glue: | | |
| 1. Rosin resin—KL1000W liquid rosin resin | 11% | |
| 2. Epoxy composite resin: | | |
| Epoxy resin—CYD-118 bisphenol | | |
| Terpene resin—GT-30A liquid terpene resin | | |
| Aluminum oxide | | |
| Polybutene | | |
| Emulsifier OP-10 | | |
| Solvent: | | |
| Cyclohexane | | |
| Diethyl ether | | |
| acetone | | |

Example 4

The manufacture of the foam fabric includes the following steps:

Step A: Cutting the foam into small (approximately 1 mm), medium (approximately 4 mm) and large (approximately 12 mm) sized particles;

Step B: Dispersing the different sized foam particles evenly, and then adding to them a foaming surfactant agent, an antibacterial agent, a filler, and a color agent after which the combination of ingredients is stirred to obtain a mixture;

Step C: Spraying a glue into the mixture from step B and stirring evenly;

Step D: Adding the mixture of step C to molding equipment and then molded at a pressure of 180 tons by pressing it in the molding equipment;

Step E: The molded foam is subjected to a steam foaming treatment in the molding equipment at a temperature of 200° C., for 30 minutes, at a pressure of the molding of 180 tons.

Step F: Removing the molded foam mixture from the molding equipment and cutting the molded foam into sections of foam fabric.

Example 4

| | |
|---|---|
| Foam Particles | 73% |
| Foam Surfactant | 0% |
| Atibacterial Agent | 0% |
| Color | 9% |
| Filler | 6% |
| Glue | 12% |
| Total | 100% |

In step B, the mixing weight ratio of particle waste, foaming agent, antibacterial agent, color agent and filler is 778:11.5:5:6:19.5; in step C, the mixing weight ratio of mixture and glue is 11:1.

The particle waste is a mixture of small particle waste, medium particle waste and large particle waste with a weight ratio of 7:4:2. The average particle size of the small particle waste is 1 mm with the range being approximately 0.1 mm to 3 mm, the average particle size of the medium particle waste is 5.5 mm, and the average particle size of the large particle waste is 10.5 mm.

In step B, the foaming surfactant agent comprises 5 parts of Azodicarbonamide, 1.8 parts of triazinyl triazine, 2.8 parts of ethanolamine and 1.8 parts of aluminum potassium sulfate; the antibacterial agent is a mixture of 2,4,4-trichloro-2'-hydroxydiphenyl ether and ethylene oxide in a weight ratio of 3.5:1; the color agent is Lac Red; the filler is titanium dioxide, iron oxide and mica powder in a weight ratio of 4:1:3 A mixture of ingredients.

In step C, the glue is a mixture of rosin resin and epoxy composite resin with a weight ratio of 1.8:4; the rosin resin is KL1000W liquid rosin resin.

In step C, the temperature of steam foaming treatment is 240° C., the time is 22 min, and the pressure of molding is 210 tons.

The epoxy composite resin adhesive comprises the following weight parts of raw materials:

| | |
|---|---|
| Epoxy resin | 27 parts |
| Terpene resin | 19 parts |
| Aluminum oxide | 3 parts |
| Polybutene | 11.5 parts |
| Emulsifier OP-10 | 7 parts |
| Solvent | 34 parts |

The epoxy resin is CYD-118 bisphenol a liquid epoxy resin; the terpene resin is GT-30A liquid terpene resin; the solvent is a mixture of cyclohexane, diethyl ether and acetone with a weight ratio of 1:3:2.4.

The epoxy composite resin adhesive is prepared by the following steps:
Step 1): According to the weight, Adding epoxy resin, terpene resin and Aluminum oxide into two-thirds of the total amount of solvent, heating to 43° C., stirring for 26 minutes to prepare material A;
Step 2): According to the weight, Adding the emulsifier OP-10 into the remaining solvent, rising the temperature to 47° C., and then mixing the ingredients evenly to prepare material B;
Step 3): Adding prepared material B into prepared material A, heating up to 55° C., stirring for 32 minutes, then adding polybutene, continue into stir for 18.5 minutes at 55° C., then heating up to 60° C. and keeping for 33 minutes to prepare epoxy composite resin adhesive for standby.

The resultant foam fabric has a density of the foam of 420/m2.

TABLE E

| Chemical components name | Example percentage | total grams = |
|---|---|---|
| Foam particles: | | |
| large | 73% | |
| medium | | |
| small | | |
| Foaming agent: | | |
| Azodicarbonamide | 0% | |
| Tiazinyl triazine | | |
| Ethanolamine | | |
| Aluminum potassium sulfate | | |
| Antibacterial agent: | | |
| 2,4,4-trichloro-2'-hydroxydiphenyl ether | 0% | |
| Ethylene oxide | | |
| Color agent—Lac Red | 9% | |
| Filler: | | |
| Titanium dioxide | 6% | |
| Iron oxide | | |
| Mica powder | | |
| Glue: | | |
| 1. Rosin resin—KL1000W liquid rosin resin | 12% | |
| 2. Epoxy composite resin: | | |
| Epoxy resin—CYD-118 | | |
| Terpene resin—GT-30Aliquid terpene resin | | |
| Aluminum oxide | | |
| Polybutene | | |
| Emulsifier OP-10 | | |
| Solvent: | | |
| Cyclohexane | | |
| Diethyl ether | | |
| acetone | | |

Example 5

The manufacture of the foam fabric includes the following steps:
Step A: Cutting the foam into small (approximately 1 mm), medium (approximately 4 mm) and large (approximately 12 mm) sized particles;
Step B: Dispersing the different sized foam particles evenly, and then adding to them a foaming surfactant agent, an antibacterial agent, a filler, and a color agent after which the combination of ingredients is stirred to obtain a mixture;
Step C: Spraying a glue into the mixture from step B and stirring evenly;
Step D: Adding the mixture of step C to molding equipment and then molded at a pressure of 180 tons by pressing it in the molding equipment;
Step E: The molded foam is subjected to a steam foaming treatment in the molding equipment at a temperature of 200° C., for 30 minutes, at a pressure of the molding of 180 tons.
Step F: Removing the molded foam mixture from the molding equipment and cutting the molded foam into sections of foam fabric.

In step B, the mixing weight ratio of particle waste, foaming agent, antibacterial agent, color agent and filler is 80:12:6:5:20; in step C, the mixing weight ratio of mixture and glue is 12:1.

The particle waste is a mixture of small particle waste, medium particle waste and large particle waste with a weight ratio of 8:3:2. The average particle size of the small particle waste is 3 mm, the average particle size of the medium particle waste is 6 mm, and the average particle size of the large particle waste is 10 mm.

In step B, each foaming agent includes 6 parts of Azodicarbonamide, 2 parts of triazinyl triazine, 3 parts of ethanolamine and 2 parts of aluminum potassium sulfate; the antibacterial agent is a mixture of 2,4,4-trichloro-2'-hydroxydiphenyl ether and ethylene oxide in a weight ratio of 4:1; the color agent is red pigment of cowberry; the filler is iron oxide.

In step C, the glue is a mixture of rosin resin and epoxy composite resin with a weight ratio of 2:3; the rosin resin is KL1000W liquid rosin resin.

In step C, the temperature of the steam foaming treatment is 260° C., the time is 20 minutes, and the molding pressure is 220 tons.

The epoxy composite resin adhesive comprises the following weight parts of raw materials:

| | |
|---|---|
| Epoxy resin | 28 parts |
| Terpene resin | 20 parts |
| Aluminum oxide | 3.5 parts |
| Polybutene | 12 parts |
| Emulsifier OP-10 | 8 parts |
| Solvent | 35 parts |

The epoxy resin is CYD-118 bisphenol a liquid epoxy resin; the terpene resin is GT-30A liquid terpene resin; the solvent is a mixture of cyclohexane, diethyl ether and acetone with a weight ratio of 1:3:2.5.

The epoxy composite resin adhesive is prepared by the following steps:

Step 1): According to the weight, Adding epoxy resin, terpene resin and Aluminum oxide into two-thirds of the total amount of solvent, heating to 45° C., stirring for 25 minutes to prepare material A;

Step 2): According to the weight, Adding the emulsifier OP-10 into the remaining solvent, rising the temperature to 48° C., and then mixing them evenly to preparing material B.

Step 3): Adding prepared material B into prepared material A, heating up to 56° C., stirring for 30 minutes, then adding polybutene, continue into stir for 18 minutes at 56° C., then heating up to 60° C. and keeping for 35 minutes to prepare epoxy composite resin adhesive for standby.

TABLE F

| Foam particles: |
|---|
| large |
| medium |
| small |
| Foaming agent: |
| Azodicarbonamide |
| Tiazinyl triazine |
| Ethanolamine |
| Aluminum potassium sulfate |
| Antibacterial agent: |
| 2,4,4-trichloro-2'-hydroxydiphenyl ether |
| Ethylene oxide |
| Color agent—red pigment of cowberry |
| Filler—Iron oxide |

TABLE F-continued

| Glue: |
|---|
| 1. Rosin resin—KL1000W liquid rosin resin |
| 2. Epoxy composite resin: |
| Epoxy resin—CYD-118 bisphenol |
| Terpene resin—GT-30A liquid terpene resin |
| Aluminum oxide |
| Polybutene |
| Emulsifier OP-10 |
| Solvent: |
| Cyclohexane |
| Diethyl ether |
| acetone |

Parallel Contrast 1

Parallel contrast 1, follows the process and ingredients of Example 3 above, except that in step C, the glue is a mixture of rosin resin and GT-30A liquid terpene resin with a weight ratio of 1.5:4.5; the rosin resin is KL1000W liquid rosin resin.

TABLE G

| Foam particles: |
|---|
| large |
| medium |
| small |
| Foaming agent: |
| Azodicarbonamide |
| Tiazinyl triazine |
| Ethanolamine |
| Aluminum potassium sulfate |
| Antibacterial agent: |
| 2,4,4-trichloro-2'-hydroxydiphenyl ether |
| Ethylene oxide |
| Color agent—bright blue |
| Filler |
| Titanium dioxide |
| Iron oxide |
| Mica powder |
| Glue: |
| 1. Rosin resin—KL1000W liquid rosin resin |
| 2. GT-30A liquid terpene resin |

Parallel Contrast 2

Parallel contrast 2, follows the process and ingredients of Example 3 above, except that the epoxy composite resin adhesive comprises the following weight parts of raw materials, substituting in particular allyl glycidyl ether for polybutene:

| | |
|---|---|
| Epoxy resin | 26.5 parts |
| Terpene resin | 19 parts |
| Aluminum oxide | 2.5 parts |
| Allyl glycidyl ether | 11 parts |
| Emulsifier OP-10 | 5 parts |
| Solvent | 33 parts |

The epoxy resin is cyd-118 type bisphenol a liquid epoxy resin; the terpene resin is GT-30A liquid terpene resin; the solvent is a mixture of cyclohexane, diethyl ether and acetone with a weight ratio of 1:3:2.3.

The epoxy composite resin adhesive is prepared by the following steps:

Step 1): According to the weight, adding epoxy resin, terpene resin and Aluminum oxide into two-thirds of the total amount of solvent, heating to 40° C., stirring for 26.5 minutes to prepare material A;

Step 2): According to the weight, adding the emulsifier OP-10 into the remaining solvent, rising the temperature to 46.5° C., and then mixing them evenly to preparing material B;

Step 3): Adding prepared material B into prepared material A, Heating up to 54° C., stirring for 35 minutes, then adding, continue into stir for 19 minutes at 54° C., then heating up to 60° C. and keeping for 32 minutes to prepare epoxy composite resin adhesive for standby.

The resultant foam fabric has a density of the foam of 450/m2.

TABLE H

Foam particles:

large
medium
small
Foaming agent:

Azodicarbonamide
Tiazinyl triazine
Ethanolamine
Aluminum potassium sulfate
Antibacterial agent:

2,4,4-trichloro-2'-hydroxydiphenyl ether
Ethylene oxide
Color agent—bright blue
Filler Titanium dioxide
Iron oxide
Mica powder
Glue:

1. Rosin resin—KL1000W liquid rosin resin
2. Epoxy composite resin:
Epoxy resin—CYD-118 bisphenol
Terpene resin—GT-30A liquid terpene resin
Aluminum oxide
allyl glycidyl ether
Emulsifier OP-10
Solvent:

Cyclohexane
Diethyl ether
acetone

A tensile strength test was carried out for each Example above by the standard for determination of tensile strength and elongation at break of GB/T 6344-1996 soft foamed polymer material. The tear strength test was carried out using the "GB 10808-1989 soft foam plastic tear test method" standard to determine the tearing strength of the foam mask. The resilience test was carried out by the standard for determination of resilience of GB/T6670-1997 soft polyurethane foam.

TABLE I

Comparison of Examples 1-5 and Parallel contrast Examples 1-2:

| | tensile strength (MPa) | tear resistance/ (N/mm) | Resilience rate (%) | compression deformation (%) |
|---|---|---|---|---|
| Example 1 | 22.3 | 56 | 91.6 | 26 |
| Example 2 | 25.1 | 59 | 92.8 | 25 |
| Example 3 | 28.3 | 64 | 94.2 | 23 |
| Example 4 | 26.8 | 63 | 93.7 | 24 |
| Example 5 | 23.4 | 60 | 92.2 | 27 |

TABLE I-continued

Comparison of Examples 1-5 and Parallel contrast Examples 1-2:

| | tensile strength (MPa) | tear resistance/ (N/mm) | Resilience rate (%) | compression deformation (%) |
|---|---|---|---|---|
| Parallel contrast 1 | 18.6 | 46 | 84.8 | 32 |
| Parallel contrast 2 | 20.7 | 57 | 88.2 | 29 |

The compression deformation test uses the "GB/T6669-1986 soft foam polymer compression permanent deformation measurement" standard to determine the compression permanent deformation performance of the foam mask. The test environment is (27+2) ° C. and the relative humidity is 65%±5%.

In Parallel contrast 1, the glue is composed of rosin resin and GT-30A liquid terpene resin instead of the rosin resin and epoxy composite resin glue of the present invention. Table I shows that this change in the glue of Proportion 1 result in reduced tensile strength, tear resistance, resilience and compression deformation of the foam fabric when compared to the results for Examples 1-5 directed to the present invention. The results also show that the viscosity of the glue when comprised of rosin resin and GT-30A liquid terpene resin is relatively low and the mixed adhesion to foam material is relatively low, so that the tear strength, tensile strength and resilience of foam are low. The combination of the epoxy composite resin adhesive and rosin resin in the present invention significantly increases the viscosity of the glue in the system, improves the stickiness and cohesion of the glue, improves the dispersion and adhesion of the glue to the materials and improves the foam tenacity, stability, softness, comfort and gives the foam high elasticity.

In Parallel contrast 2, allyl glycidyl ether is substituted for the polybutene used in the glue of the present invention. As seen in Table I above, Proportion 2 has reduced tensile strength, tear resistance, resilience and compression deformation of the foam fabric when compared to Examples 1-5 directed to the present invention. The results show that the viscosity of the composite resin glue of the present invention using polybutene has improved dispersion uniformity of the composite resin glue to other materials and results in a foam fabric having stable mechanical properties, soft and comfortable texture and high elasticity.

CONCLUSION

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:
1. A foam fabric comprised of:
foam particles;
a foaming agent comprising azodicarbonamide, triazinyl triazine, ethanolamine and aluminum potassium sulfate;
an antibacterial agent comprised of 2,4,4'-trichloro-2'-hydroxydiphenyl ether and ethylene oxide;

a filler selected from the group consisting of titanium dioxide, iron oxide, mica powder and combinations thereof;

a glue comprising a rosin resin and an epoxy composite resin, wherein the epoxy composite resin is comprised of an epoxy resin, a terpene resin, aluminum oxide, polybutene and an emulsifier and a solvent.

2. The foam fabric of claim 1, wherein the solvent is comprised of cyclohexane, diethyl ether and acetone.

3. The foam fabric of claim 1, wherein the foam fabric is comprised of from about 8 to about 13% by weight glue, from about 62 to about 80% by weight foam particles, from about 4 to about 8% by weight color agent, from about 3 to about 8% by weight antibacterial agent, from about 8 to about 12% by weight foaming agent and from about 10 to about 20% by weight of a filler.

4. The foam fabric of claim 1, wherein the foam particles are foam scraps and fragments remaining from the manufacture of other products.

5. The foam fabric of claim 1, wherein the area density of the foam fabric is from about 300 to about 450 g/m2.

6. A method of making a foam fabric comprising the steps of:
1) forming foam into particles of different sizes;
2) evenly dispersing the different sized foam particles and then adding to them a foaming surfactant agent, an antibacterial agent, a filler, and optionally a color agent;
3) stirring the ingredients from step 2 to obtain a mixture;
4) adding a glue comprised of a rosin resin and an epoxy composite resin into the mixture of step 3 and then stirring the mixture and the glue together, wherein the epoxy composite resin is comprised of an epoxy resin, a terpene resin, aluminum oxide, polybutene, an emulsifier and a solvent;
5) adding the mixture of step 4 to molding equipment and then apply pressure and steam to the mixture to form molded foam;
6) steam foaming the molded foam treatment;
7) removing the molded foam mixture from the molding equipment;
8) cutting the molded foam into sections having a desired length and thickness to form a foam fabric;
wherein the foaming agent is comprised of azodicarbonamide, triazinyl triazine, ethanolamine and aluminum potassium sulfate, the antibacterial agent is comprised of 2,4,4'-trichloro-2'-hydroxydiphenyl ether and ethylene oxide and the filler is selected from the group consisting of titanium dioxide, iron oxide, mica powder and combinations thereof.

7. The method of making a foam fabric of claim 6, wherein the solvent is comprised of cyclohexane, diethyl ether and acetone.

8. The method of making a foam fabric of claim 7, wherein the epoxy composite resin is prepared by the following steps:
1) adding epoxy resin, terpene resin and aluminum oxide into two-thirds of the total amount of solvent, heating to temperature of from about 35 to about 45° C., and then stirring for about 25 to about 28 minutes to prepare material A;
2) adding the emulsifier into the remaining one-third of the total amount of solvent, heating to a temperature of from about 45 to about 48° C., and then mixing the ingredients to prepare material B;
3) adding material B into material A and then heating the combination at a temperature of from about 52 to about 56° C., for approximately 30-40 minutes, 4) adding polybutene and stirring the mixture for approximately 18 to 20 minutes at from about 52 to about 56° C.;
5) heating the mixture at a temperature of about 60° C. for approximately 30 to 35 minutes to prepare the epoxy composite resin.

9. The method of making a foam fabric of claim 6, wherein the foam fabric is comprised of from about 8 to about 13% by weight glue, from about 62 to about 80% by weight foam, from about 4 to about 8% by weight color agent, from about 3 to about 8% by weight antibacterial agent, from about 8 to about 12% by weight foaming surfactant agent and from about 10 to about 20% by weight of a filler.

10. The method of making a foam fabric of claim 6, wherein the foam particles are foam scraps and fragments remaining from the manufacture of other products.

11. The method of making a foam fabric of claim 6, wherein the mixing weight ratio of foam particles, foaming surfactant agent, antibacterial agent, color agent and filler is 70-80:10-12:3-6:5-8:18-20 and the mixing weight ratio of the mixture of step 3 and the glue is 8-12:1.

12. The method of making a foam fabric of claim 6, wherein the particles of foam are a mixture of small particles, medium particles and large particles with a weight ratio of 5-8:3-6:2, wherein the average size of the small particles is from about 1 to about 3 mm, the average size of the medium particles is from about 4 to about 6 mm, and the average size of the large particles is from about 10 to about 12 mm.

13. The method of making a foam fabric of claim 6, wherein the foaming agent comprises 3-6 parts by weight of azodicarbonamide, 1-2 parts by weight of triazinyl triazine, 2-3 parts by weight of ethanolamine and 1-2 parts by weight of aluminum potassium sulfate, and the antibacterial agent is a mixture of 2,4,4'-trichloro-2'-hydroxydiphenyl ether and ethylene oxide with a weight ratio of 2-4:1.

14. The method of making a foam fabric of claim 6, wherein the mixture of step 4 is steam foamed at a temperature of from about 200 to about 260° C. for about 20 to about 30 minutes and the mixture is molded at a pressure of about 180 to about 220 tons.

15. The method of making a foam fabric of claim 6, wherein the area density of the foam fabric is from about 300 to about 450 g/m2.

16. The method of making a foam fabric of claim 6, wherein the glue is sprayed into the mixture of step 3.

17. A method of making a foam fabric comprising the steps of:
1) forming foam into particles of different sizes and evenly dispersing the different sized foam particles;
2) adding a foaming agent, an antibacterial agent, a color agent, and a filler to the foam particles and then mixing them with the different size foam particles,
3) adding a glue comprised of a rosin resin and an epoxy composite resin into the mixture of step 2 and then stirring the mixture of step 2 and the glue together, wherein the epoxy composite resin is comprised of an epoxy resin, a terpene resin, aluminum oxide, polybutene, an emulsifier and a solvent;
4) adding the mixture of step 3 to molding equipment and then apply pressure and steam to the mixture to form molded foam;
5) steam foaming the molded foam treatment;
6) removing the molded foam mixture from the molding equipment;

7) cutting the molded foam into sections having a desired length and thickness to form a foam fabric wherein the foaming agent is comprised of azodicarbonamide, triazinyl triazine, ethanolamine and aluminum potassium sulfate, the antibacterial agent is comprised of 2,4,4'-trichloro-2'-hydroxydiphenyl ether and ethylene oxide and the filler is selected from the group consisting of titanium dioxide, iron oxide, mica powder and combinations thereof.

* * * * *